US007478695B2

(12) United States Patent
Leppanen et al.

(10) Patent No.: US 7,478,695 B2
(45) Date of Patent: Jan. 20, 2009

(54) STARTER ASSEMBLY FOR A MOTORCYCLE ENGINE

(75) Inventors: Robert L. Leppanen, Wauwatosa, WI (US); Brian M. Curtis, Waukesha, WI (US); Michael T. Arndt, Greenfield, WI (US); Peter J. Duvernell, Colgate, WI (US); Michael Duley, Slinger, WI (US); John W. Schanz, Mequon, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 481 days.

(21) Appl. No.: 11/219,069

(22) Filed: Sep. 2, 2005

(65) Prior Publication Data

US 2007/0017466 A1 Jan. 25, 2007

Related U.S. Application Data

(60) Provisional application No. 60/696,326, filed on Jul. 1, 2005.

(51) Int. Cl.
*B62M 7/00* (2006.01)

(52) U.S. Cl. .................................................... 180/219

(58) Field of Classification Search .................. 180/219
See application file for complete search history.

(56) References Cited

U.S. PATENT DOCUMENTS

| | | | | | |
|---|---|---|---|---|---|
| 4,869,332 | A | * | 9/1989 | Fujita et al. | 180/65.2 |
| 4,870,874 | A | * | 10/1989 | Ito | 74/665 T |
| 4,903,483 | A | * | 2/1990 | Atsuumi et al. | 60/313 |
| 4,920,825 | A | * | 5/1990 | Okazaki et al. | 74/606 R |
| 6,425,451 | B2 | * | 7/2002 | Yoshida et al. | 180/219 |
| 6,481,408 | B2 | * | 11/2002 | Tsutsumikoshi | 123/195 R |
| 7,051,824 | B1 | * | 5/2006 | Jones et al. | 180/68.3 |
| 7,140,458 | B2 | * | 11/2006 | Nakagawa et al. | 180/65.1 |

OTHER PUBLICATIONS

Harley-Davidson 1993/1994 Parts Catalog (Part No. 99451-94), Harley-Davidson Motor Company, p. 10.
Fig. A. illustrates an admitted prior art starter assembly.

* cited by examiner

*Primary Examiner*—Paul N Dickson
*Assistant Examiner*—Michael R Stabley
(74) *Attorney, Agent, or Firm*—Michael Best & Friedrich LLP

(57) ABSTRACT

A motorcycle power transmission assembly including an engine, a transmission, a drive assembly, and a starter assembly. The engine includes a crankcase, and the transmission includes a transmission case coupled to the crankcase to define an engine-transmission assembly. The drive assembly includes a drive housing coupled to the engine-transmission assembly to define a drive chamber. The drive housing including an opening, and the drive assembly further includes a starter gear. The starter assembly is mounted to the drive housing and includes a nose portion that extends through the opening. The nose portion includes a pinion gear adapted to engage the starter gear.

14 Claims, 5 Drawing Sheets

STARTER ASSEMBLY FOR A MOTORCYCLE ENGINE

CROSS-REFERENCE TO RELATED APPLICATIONS

This application claims priority to U.S. Provisional Patent Application No. 60/696,326, filed Jul. 1, 2005, the entire contents of which are hereby incorporated by reference herein.

FIELD OF THE INVENTION

The present invention relates generally to the field of motorcycles, and particularly to starters for motorcycle engines.

BACKGROUND OF THE INVENTION

Like most vehicles having internal combustion engines, motorcycles have starters for starting the engine. Starters are typically electric motors powered by the vehicle battery and include a pinion that drives a starter gear that rotates with the engine. The pinion is commonly mounted for axial movement between a retracted position, where the pinion and gear are disengaged, and an extended position, where the pinion engages the gear. The pinion is typically biased toward the retracted position and is moved toward the extended position by a solenoid.

Some motorcycles include an engine assembly that is separate from the transmission assembly. In these vehicles, a primary drive assembly is commonly utilized to transfer power from the engine crank shaft to an input shaft of the transmission assembly. The primary drive assembly can include a number of suitable power transmission elements, including gearing arrangements, belt and pulley systems, or chain and sprocket systems. Many primary drive assemblies include housings that protect or support the power transmission elements. The housing may also function to contain fluids for lubrication of the power transmission elements.

In some motorcycles utilizing a primary drive assembly, the starter gear is positioned within the primary housing and coupled for rotation with the power transmission elements. In these systems, the starter is commonly mounted to a flange on the transmission housing and is positioned such that the pinion extends through an opening in the primary housing to engage the starter gear.

Due to the need to provide a flange for mounting the starter, the transmission housing can be a very complicated casting. It would be desirable to simplify the mounting of the starter so as to avoid the need for a complicated transmission casting.

SUMMARY

The present invention provides a motorcycle having a power transmission assembly including a engine having a crankcase, a transmission having transmission case coupled to the crankcase to define an engine-transmission assembly, a drive assembly including a drive housing coupled to the engine-transmission assembly and defining a drive chamber, and a starter assembly mounted to the drive housing and including a nose portion that extends through an opening in the drive housing, the nose portion including a pinion gear adapted to engage a starter gear in the drive housing. By mounting the starter assembly to the drive housing, there is no need to have a separate mounting flange.

In one embodiment, the drive housing includes an inner housing mounted to the engine-transmission assembly, and an outer housing mounted to the inner housing. In this embodiment, the starter assembly can be mounted to the inner housing.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
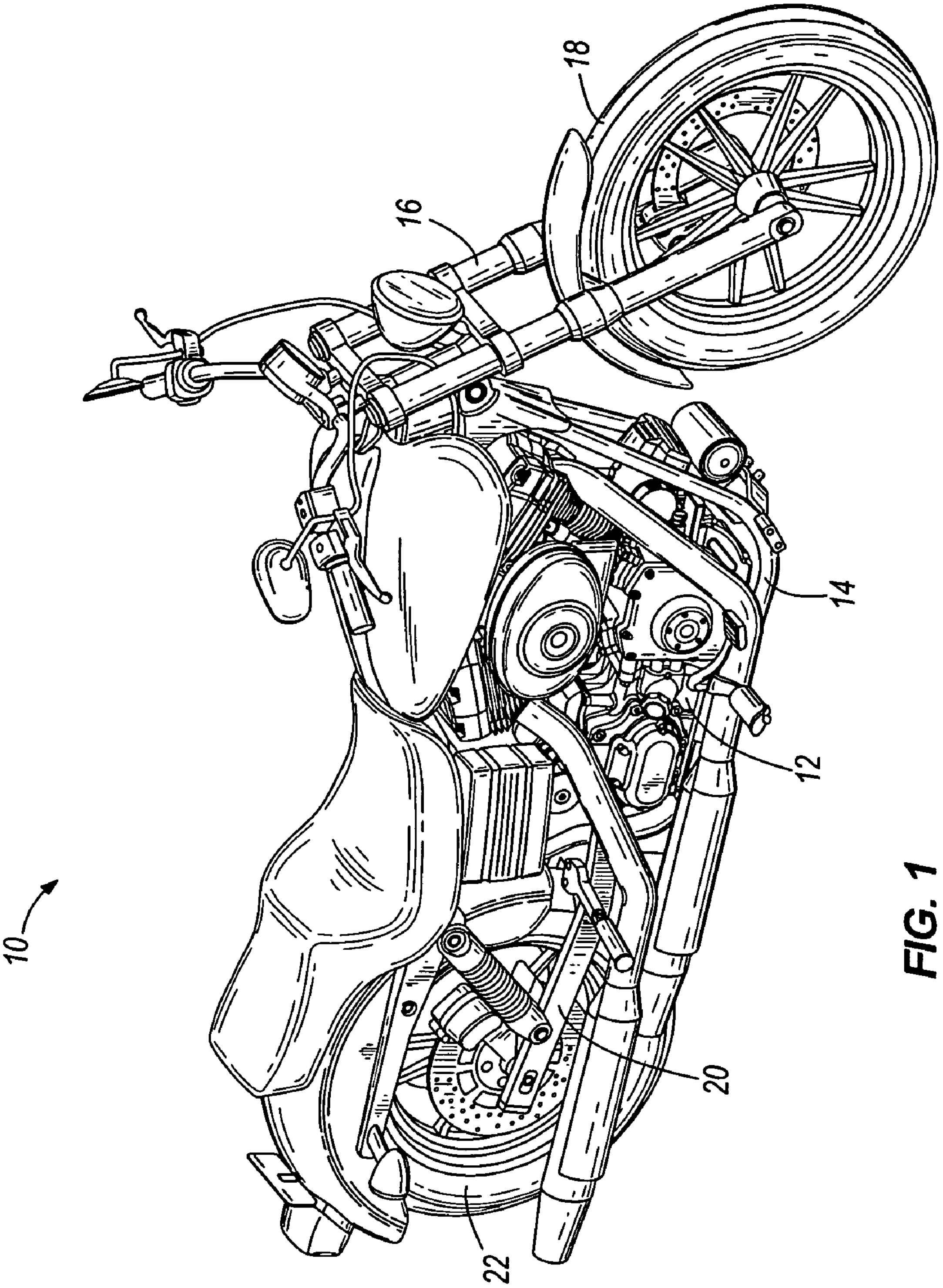
FIG. 1 is a perspective view of a motorcycle having an engine assembly, a transmission assembly, a primary drive assembly, and a starter embodying the present invention.

FIG. 1 illustrates a motorcycle 10 including a powertrain assembly 12 embodying the present invention. The motorcycle 10 includes a frame 14, a steering assembly 16 pivotally coupled to a forward portion of the frame 14 and a front wheel 18 rotatably coupled to the steering assembly 16. A swingarm 20 is pivotably coupled to a rearward portion of the frame 14, and a rear wheel 22 is rotatably coupled to the swingarm 22.

Figure 2:
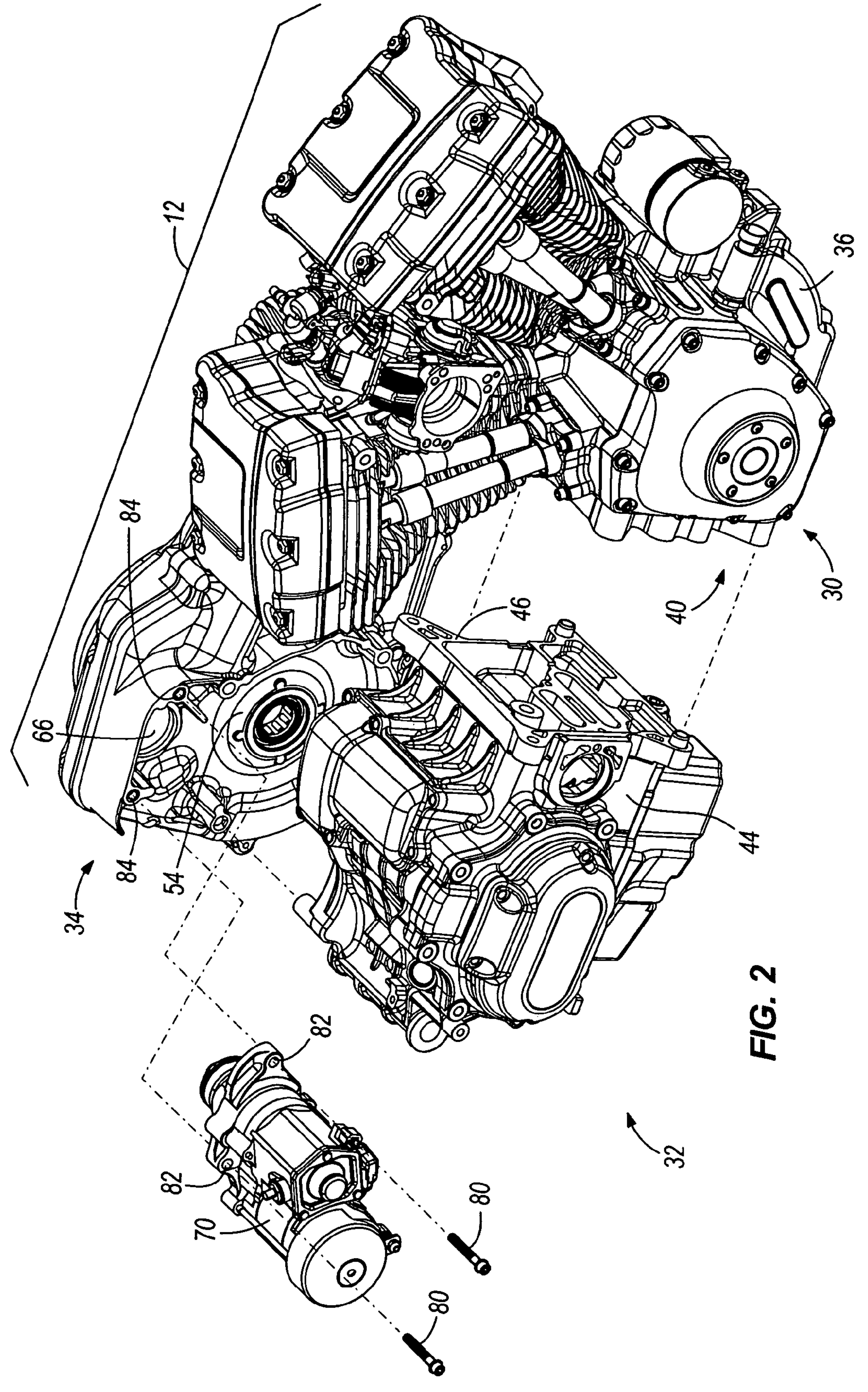
FIG. 2 is an exploded, right side perspective view of the engine assembly, transmission assembly, primary drive assembly, and starter from the motorcycle of FIG. 1.
Figure 3:
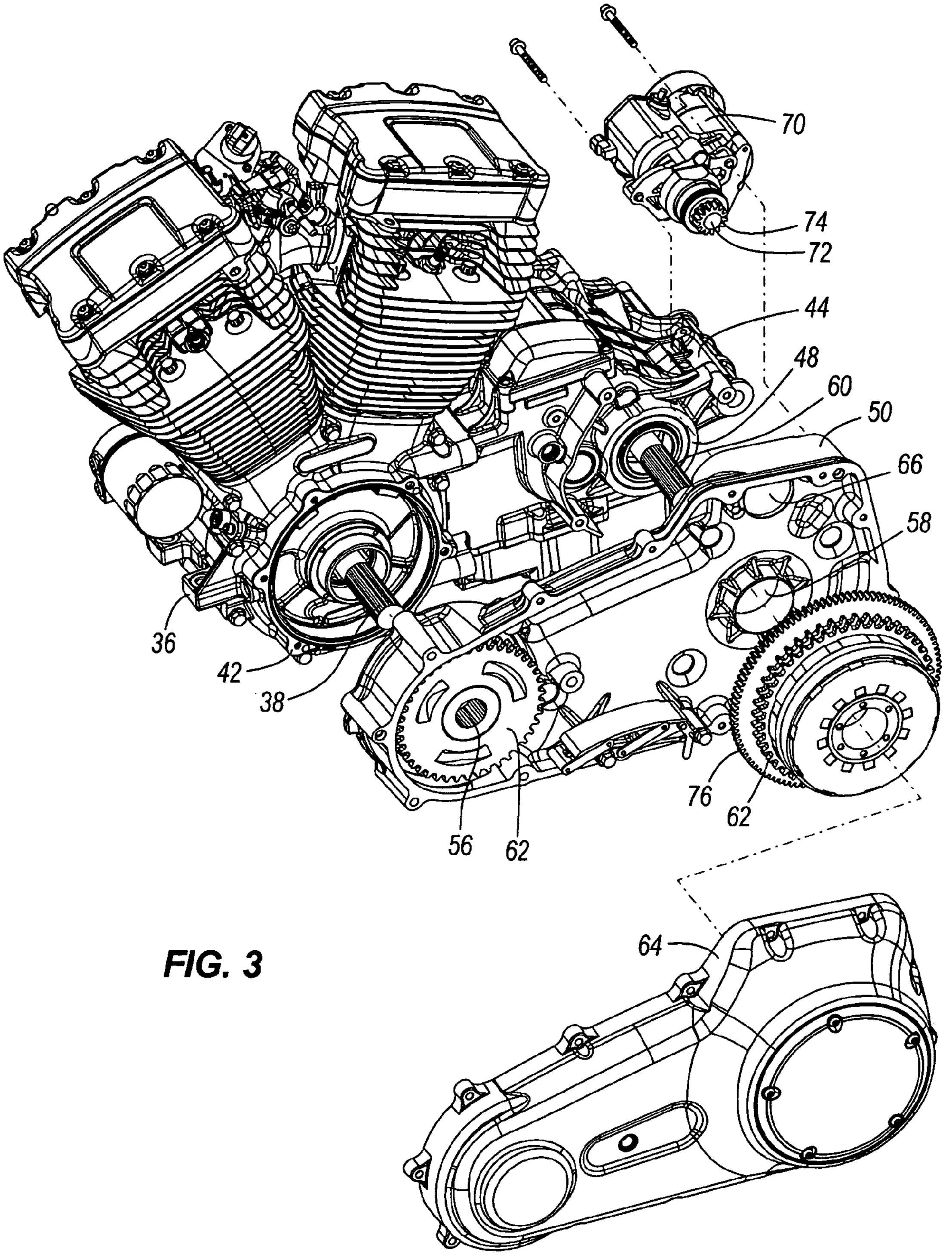
FIG. 3 is an exploded, left side perspective view of the assembly illustrated in FIG. 2.
Figure 4:
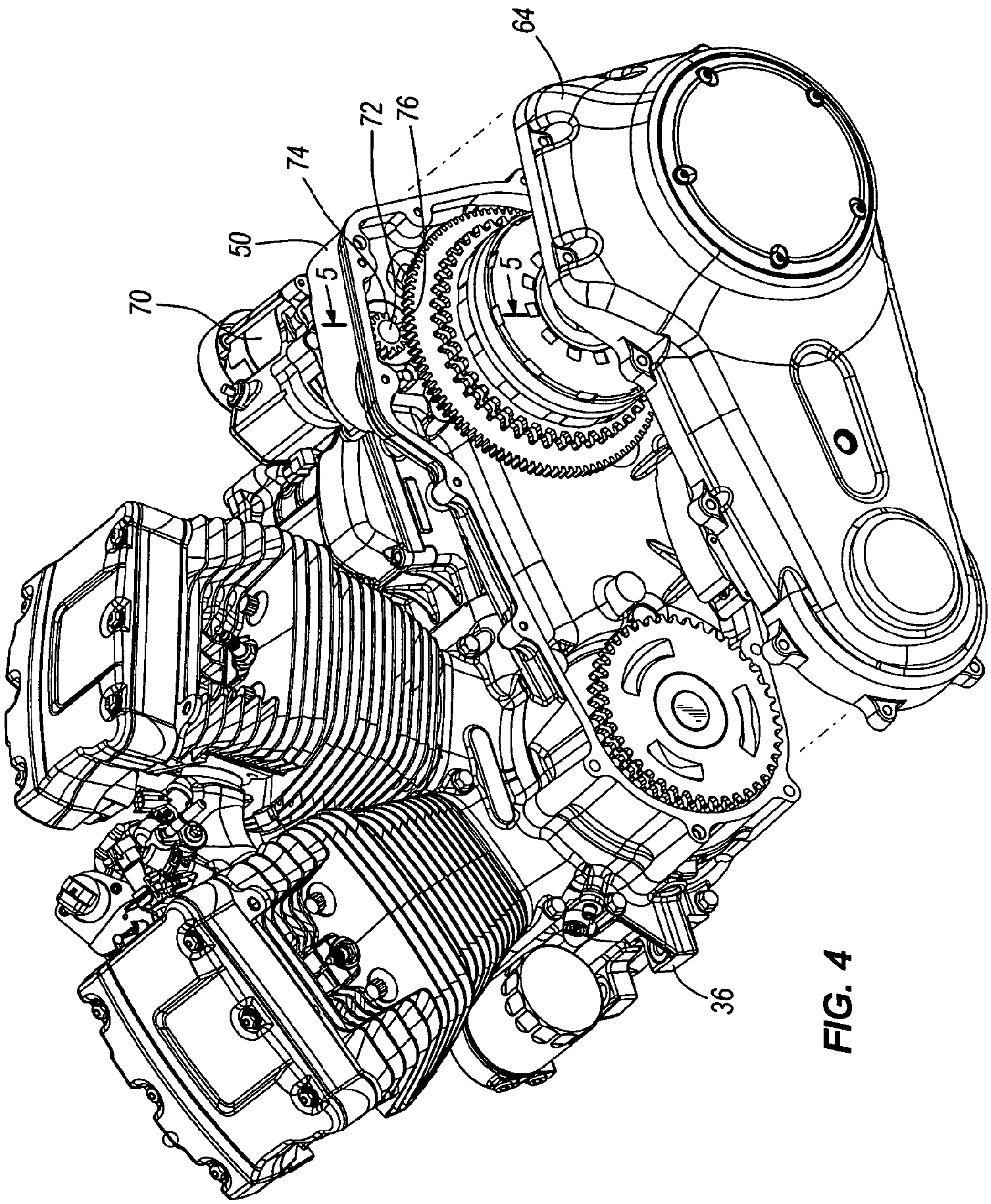
FIG. 4 is a left side perspective view of the assembly of FIGS. 2 and 3.
Figure 5:
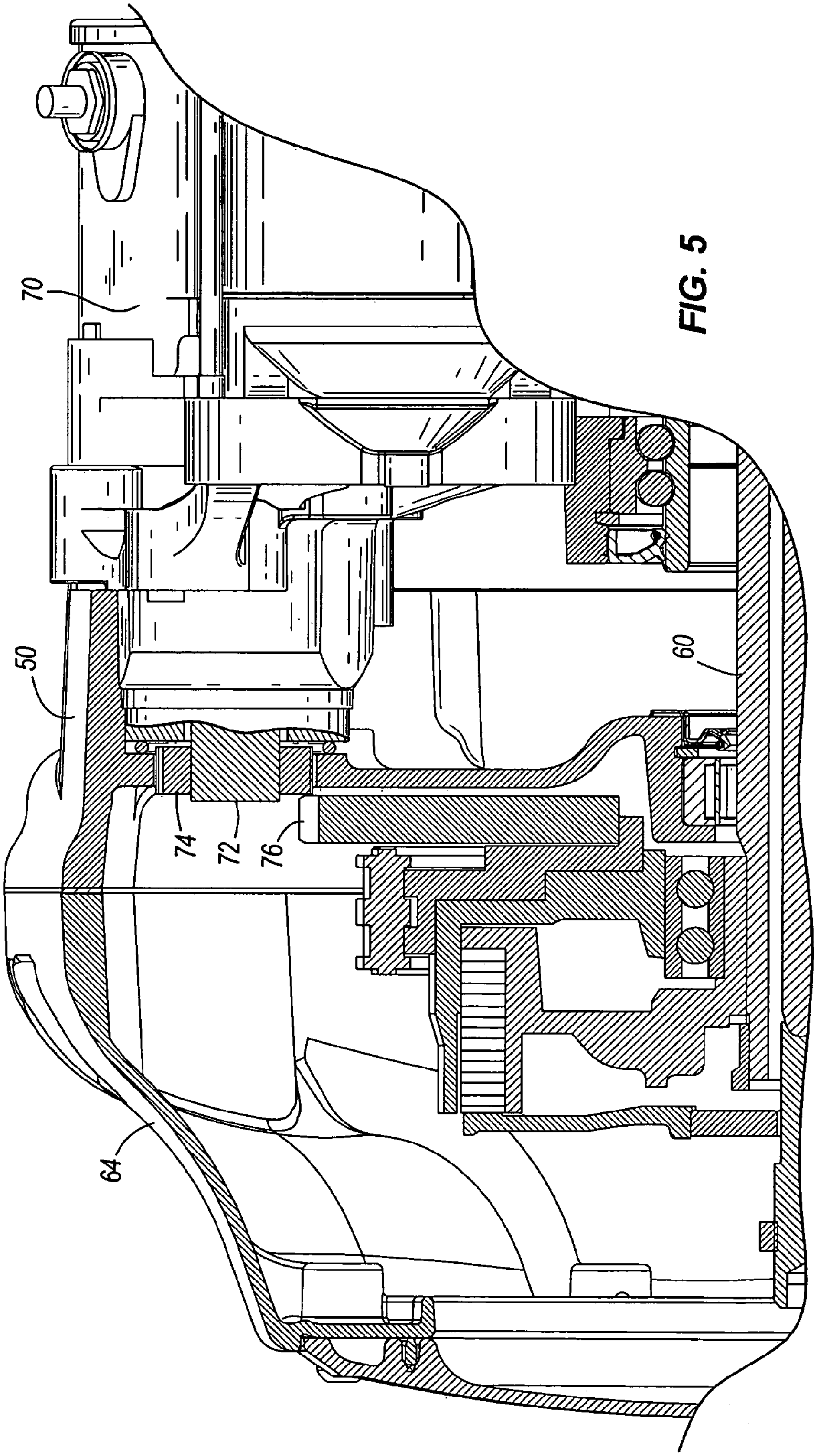
FIG. 5 is a section view taken along line 5-5 of FIG. 4.

Referring to FIGS. 2-4, the illustrated powertrain assembly 12 includes an engine 30, a transmission 32 secured to the engine 30, and a primary drive assembly 34 secured to both the engine 30 and the transmission 32 for transferring power from the engine 30 to the transmission 32. It should be understood that, while the illustrated embodiment illustrates a transmission that is distinct from and bolted to an engine, the concepts of the present invention also apply to engine and transmission assemblies that are formed using an integral housing.

The engine 30 includes a crank case 36 that supports a crank shaft 38 for rotation. The crank case 36 includes a first interface portion 40 (FIG. 2) for securing to the transmission 32, and a second interface portion 42 (FIG. 3) for securing to the primary drive assembly 34. The transmission 32 includes a transmission housing 44 having a third interface portion 46 secured to the first interface portion 40 of the crank case 36, and a fourth interface portion 48 (FIG. 3) secured to the primary drive assembly 34.

The primary drive assembly 34 includes an inner housing 50 having a fifth interface portion 52 secured to the second interface portion 42 of the crank case 36, and a sixth interface portion 54 secured to the fourth interface portion 48 of the transmission housing 44. The inner housing 50 includes a crank shaft opening 56 through which the crank shaft 38 extends, and a transmission shaft opening 58 through which a transmission shaft 60 extends. The illustrated primary drive assembly 34 includes sprockets 62 secured to the crank shaft 38 and transmission shaft 60, and a chain (not shown) linking the sprockets 62. However, it should be understood that other drive systems, such as those incorporating belts and pullies or gearing arrangements can be used instead. An outer housing 64 is secured to the inner housing 50 to enclose the primary drive components within the primary housing.

As best shown in FIGS. 2-4, the inner housing 50 further includes a starter opening 66 through which a portion of a starter 70 is positioned. More specifically, the starter 70 includes a starter shaft 72 and a pinion 74 that extend through the starter opening 66 in a position to engage a starter gear 76 coupled to the transmission shaft 60.

In order to properly position the pinion 74 relative to the starter gear 76, the starter 70 is secured directly to and supported by the inner housing 50. In the illustrated embodiment, the starter 70 is secured to the inner housing 50 by two threaded fasteners 80 positioned through holes 82 in the starter 70 and threaded into threaded openings 84 in the inner housing 50. By virtue of this design, the starter 70 is secured directly to the primary drive assembly 34, thus avoiding the need to have a special mounting flange incorporated into the transmission housing 44.

What is claimed is:

1. A motorcycle power transmission assembly comprising:

an engine having a crankcase;

a transmission having a transmission case coupled to the crankcase to define an engine-transmission assembly;

a drive assembly including a drive housing coupled to the engine-transmission assembly and defining a drive chamber, the drive housing including an opening, and the drive assembly further including a starter gear; and a starter assembly mounted to the drive housing and including a nose portion that extends through the opening, the nose portion including a pinion gear adapted to engage the starter gear; wherein the drive housing includes an inner housing and an outer housing, wherein the inner housing is mounted to the engine-transmission assembly, wherein the outer housing is mounted to the inner housing, and wherein the starter assembly is mounted to the inner housing.

2. The motorcycle power transmission assembly of claim 1, wherein the starter assembly is secured to the drive housing by two fasteners.

3. The motorcycle power transmission assembly of claim 1, wherein the starter assembly is mounted only to the drive housing and is not directly supported by the engine-transmission assembly.

4. The motorcycle power transmission assembly of claim 1, wherein the engine-transmission assembly includes a crank chamber defined by the crankcase, a transmission chamber defined by the transmission case, and a crankcase-transmission interface extending between and separating the crank chamber and the transmission chamber.

5. The motorcycle power transmission assembly of claim 4, wherein the drive housing is coupled to the crankcase to define a substantially planar crankcase-drive housing interface, wherein the crankcase-transmission interface is substantially planar, and wherein the crankcase-drive housing interface is substantially normal to the crankcase-transmission interface.

6. The motorcycle power transmission assembly of claim 1, wherein the nose portion includes a cylindrical portion and the drive housing includes a cylindrical surface that defines the opening, the motorcycle engine further comprising an O-ring seal between the cylindrical portion and the cylindrical surface.

7. The motorcycle power transmission assembly of claim 1, wherein the drive assembly includes a clutch assembly supported for rotation within the drive housing, and wherein the starter gear is coupled to the clutch assembly.

8. A motorcycle comprising:

a frame;

a steering assembly pivotally coupled to the frame;

a front wheel coupled to the steering assembly and supporting a forward portion of the motorcycle;

a rear wheel coupled to the frame and supporting a rearward portion of the motorcycle;

a power transmission assembly coupled to the frame, the power transmission assembly including:

an engine having a crankcase;

a transmission having a transmission case coupled to the crankcase to define an engine-transmission assembly;

a drive assembly including a drive housing coupled to the engine-transmission assembly and defining a drive chamber, the drive housing including an opening, and the drive assembly further including a starter gear; and a starter assembly mounted to the drive housing and including a nose portion that extends through the opening, the nose portion including a pinion gear adapted to engage the starter gear; wherein the drive housing includes an inner housing and an outer housing, wherein the inner housing is mounted to the engine-transmission assembly, wherein the outer housing is mounted to the inner housing, and wherein the starter assembly is mounted to the inner housing.

9. The motorcycle of claim 8, wherein the starter assembly is secured to the drive housing by two fasteners.

10. The motorcycle of claim 8, wherein the starter assembly is mounted only to the drive housing and is not directly supported by the engine-transmission assembly.

11. The motorcycle of claim 8, wherein the engine-transmission assembly includes a crank chamber defined by the crankcase, a transmission chamber defined by the transmission case, and a crankcase-transmission interface extending between and separating the crank chamber and the transmission chamber.

12. The motorcycle of claim 11, wherein the drive housing is coupled to the crankcase to define a substantially planar crankcase-drive housing interface, wherein the crankcase-transmission interface is substantially planar, and wherein the crankcase-drive housing interface is substantially normal to the crankcase-transmission interface.

13. The motorcycle of claim 8, wherein the nose portion includes a cylindrical portion and the drive housing includes a cylindrical surface that defines the opening, the motorcycle engine further comprising an O-ring seal between the cylindrical portion and the cylindrical surface.

14. The motorcycle of claim 8, wherein the drive assembly includes a clutch assembly supported for rotation within the drive housing, and wherein the starter gear is coupled to the clutch assembly.

* * * * *